US009419885B2

(12) United States Patent
Boutros et al.

(10) Patent No.: US 9,419,885 B2
(45) Date of Patent: *Aug. 16, 2016

(54) OPERATING MPLS LABEL SWITCHED PATHS AND MPLS PSEUDOWIRE IN LOOPBACK MODE

(71) Applicant: Cisco Technology, Inc., San Jose, CA (US)

(72) Inventors: Sami Boutros, San Ramon, CA (US); Muthurajah Sivabalan, Kanata (CA); David D. Ward, Los Gatos, CA (US); George Swallow, Boston, MA (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 13/770,624

(22) Filed: Feb. 19, 2013

(65) Prior Publication Data

US 2013/0155877 A1    Jun. 20, 2013

Related U.S. Application Data

(63) Continuation of application No. 12/383,366, filed on Mar. 23, 2009, now Pat. No. 8,391,163.

(51) Int. Cl.
H04L 12/26 (2006.01)
H04L 12/701 (2013.01)
H04L 12/733 (2013.01)
H04L 12/723 (2013.01)
H04L 12/721 (2013.01)

(52) U.S. Cl.
CPC .............. *H04L 43/50* (2013.01); *H04L 45/00* (2013.01); *H04L 45/20* (2013.01); *H04L 45/50* (2013.01); *H04L 45/68* (2013.01)

(58) Field of Classification Search
CPC ......... H04L 43/50; H04L 45/50; H04L 45/00; H04L 45/20; H04L 45/68
USPC ........ 370/241, 241.1, 248, 249; 379/1.01, 22, 379/22.01
See application file for complete search history.

(56) References Cited

U.S. PATENT DOCUMENTS

| 6,154,448 | A | 11/2000 | Petersen et al. |
| 7,343,423 | B2 | 3/2008 | Goguen et al. |
| 7,408,941 | B2 | 8/2008 | Martini et al. |
| 7,483,387 | B2 | 1/2009 | Guichard et al. |
| 7,995,483 | B1 * | 8/2011 | Bayar et al. ................ 370/241.1 |

(Continued)

OTHER PUBLICATIONS

Boutros, Sami, et al., "Operating MPLS Transport Profile LSP in Loopback Mode (draft-boutros-mpls-tp-loopback-02.txt)", Network Working Group internet Draft, IETF, Mar. 9, 2009, pp. 1-22.

Primary Examiner — Obaidul Huq
(74) Attorney, Agent, or Firm — Polsinelli PC

(57) ABSTRACT

In one embodiment, a circuit that extends between a head-end label switching router (LSR) and a tail-end LSR and traverses one or more intermediate LSRs is locked to data plane traffic. The head-end LSR transmits a packet along the circuit that includes a particular time-to-live (TTL) value configured to expire at a particular intermediate LSR at which loopback is to occur. The circuit is used in a loopback mode. The head-end LSR transmits along the circuit a packet that includes a cease loopback request. The circuit ceases to be used in the loopback mode. The circuit is unlocked to permit the circuit to pass data plane traffic.

20 Claims, 6 Drawing Sheets

(56) References Cited

U.S. PATENT DOCUMENTS

| | | |
|---|---|---|
| 2004/0052257 A1 | 3/2004 | Abdo et al. |
| 2004/0193709 A1 | 9/2004 | Selvaggi et al. |
| 2005/0044262 A1 | 2/2005 | Luo |
| 2005/0097219 A1 | 5/2005 | Goguen et al. |
| 2005/0243732 A1 | 11/2005 | Bitar et al. |
| 2006/0013145 A1 | 1/2006 | Boodaghians |
| 2006/0045028 A1 | 3/2006 | Hasan et al. |
| 2006/0047851 A1 | 3/2006 | Voit et al. |
| 2006/0132265 A1 | 6/2006 | Laurila |
| 2006/0146832 A1 | 7/2006 | Rampal et al. |
| 2006/0198321 A1 | 9/2006 | Nadeau et al. |
| 2006/0215548 A1 | 9/2006 | Le Faucheur et al. |
| 2006/0245436 A1 | 11/2006 | Sajassi |
| 2007/0008982 A1 | 1/2007 | Voit et al. |
| 2008/0112331 A1* | 5/2008 | Long et al. .......... 370/245 |
| 2008/0279110 A1 | 11/2008 | Hart et al. |
| 2009/0154462 A1 | 6/2009 | Tochio |

\* cited by examiner

OPERATING MPLS LABEL SWITCHED PATHS AND MPLS PSEUDOWIRE IN LOOPBACK MODE

RELATED APPLICATIONS

The present application is a continuation of U.S. patent application Ser. No. 12/383,366, titled "Operating MPLS Label Switched Paths and MPLS Pseudowire in Loopback Mode", filed by Sami Boutros et al. on Mar. 23, 2009, the contents of which are incorporated by reference herein in their entirety.

TECHNICAL FIELD

The present disclosure relates generally to computer networks, and, more particularly, to Multi-Protocol Label Switching (MPLS) technology.

BACKGROUND

In traditional transport networks, circuits are provisioned on multiple switches and service providers operate the transport circuit (e.g., a T1 line) in loopback mode for management purposes. For example, by instructing a device on a circuit to operate in loopback mode, a service provider may test connectivity of the circuit up to that specific device on the circuit's path by sending packets to that device, and monitoring the return ("loopback") of the packets. Multi-Protocol Label Switching Transport Profile (MPLS-TP) networks are currently being deployed by service providers to emulate traditional circuits with MPLS Label Switched Paths (LSPs) or Psuedowires (PWs). These MPLS-TP networks currently do not provide the loopback capability.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an initiating maintenance end point (MEP) may transmit a lock message to lock a circuit traversing one or more maintenance intermediate points (MIPs) between the initiating MEP and an end MEP. The initiating MEP may then transmit an in-band packet containing a loopback request to a particular MIP along the circuit using a particular time-to-live (TTL) value in the packet to reach the particular MIP. Upon receiving the packet at the particular MIP, and in response to determining that the TTL has expired, the particular MIP inspects the packet to discover the loopback request, and correspondingly operates in a loopback mode.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
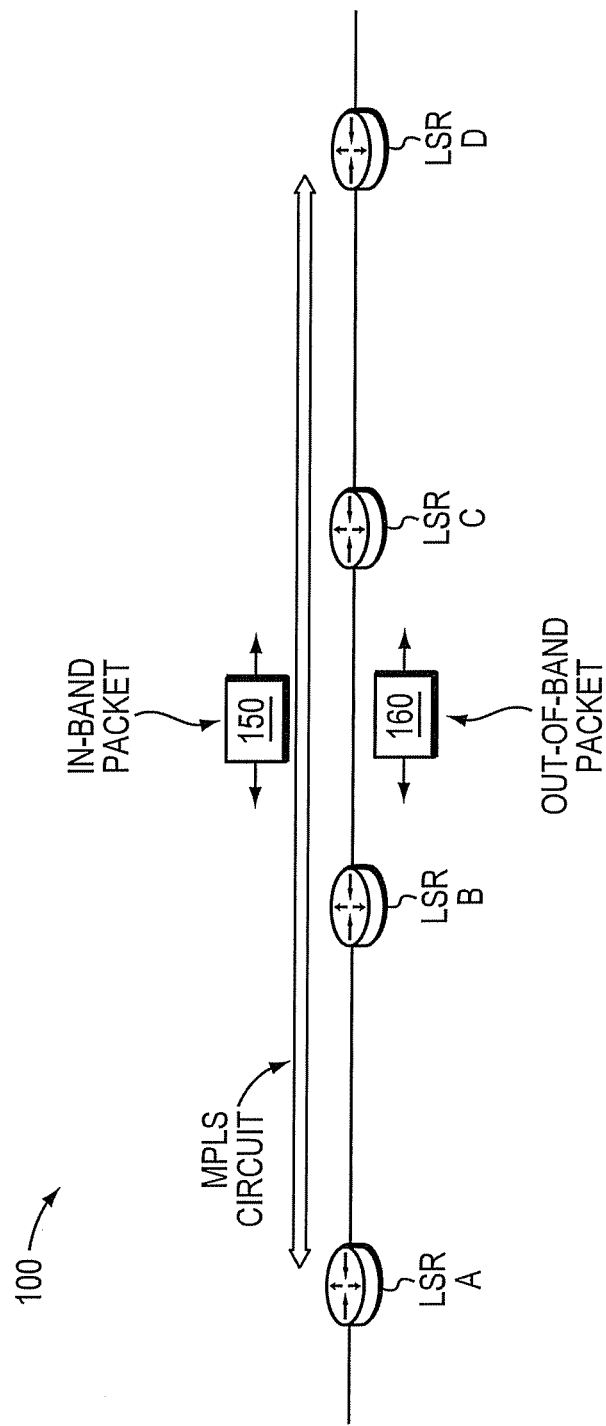
FIG. 1 illustrates an example computer network.

FIG. 1 is a schematic block diagram of an example computer network 100 illustratively comprising nodes/devices, such as one or more link state routers (LSRs) A-D interconnected by links as shown. Illustratively, the network 100 is embodied as a multi-protocol label switching (MPLS) network, where the LSRs communicate using labels prepended to packets in a manner that establishes MPLS "circuits" through the network. Packets sent through the circuit are considered "in-band" packets 150, while packets not sent through the circuit (e.g., using other protocols where available, such as the Internet Protocol (IP), User Datagram Protocol (UDP), etc.) are considered "out-of-band" packets 160. Illustratively, as used herein, an MPLS "circuit" may be either an MPLS label switched path (LSP) or an MPLS pseudowire (PW), as will be understood by those skilled in the art. Those skilled in the art will also understand that any number of nodes, devices, links, etc. may be used in the computer network, and that the view shown herein is for simplicity.

Figure 2:
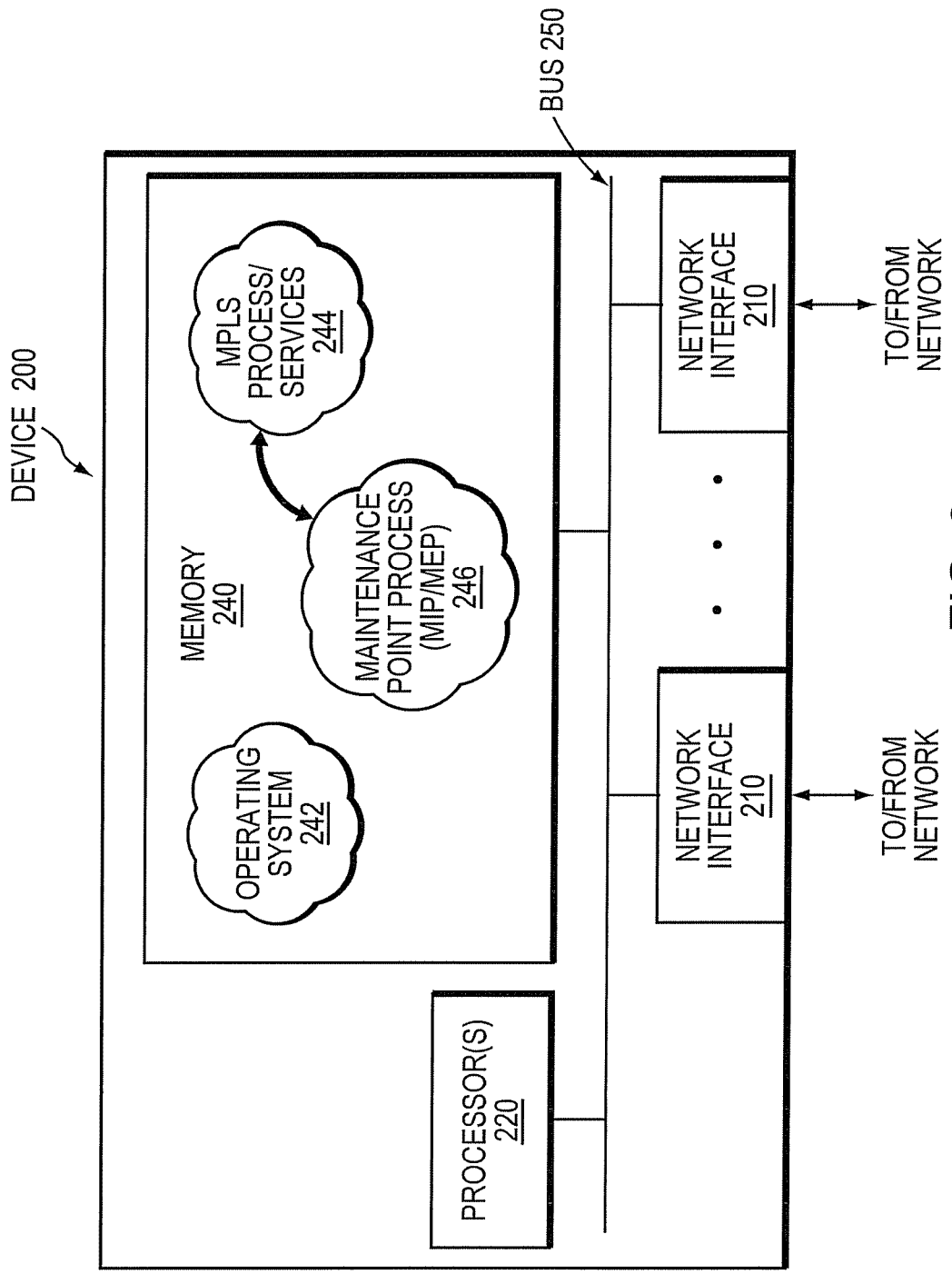
FIG. 2 illustrates an example network device.

FIG. 2 is a schematic block diagram of an example node/device 200 that may be advantageously used with one or more embodiments described herein, e.g., as an LSR. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, MPLS (LSPs and/or PWs), IP, UDP, etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic configured to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise an MPLS process 244 and a maintenance point process 246, e.g., for maintenance end points (MEPs) or maintenance intermediate points (MIPs), accordingly. It will be apparent to those skilled in the art that other types of processors and memory, including various computer-readable media, may be used to store and execute program instructions pertaining to the inventive technique described herein. In addition, while the MEP/MIP process 246 is shown within general memory 240, those skilled in the art will appreciated that MEP/MIP process 246 (and other relevant processes) may be contained as a component within network interfaces 210 (e.g., in an ASIC of the network interface, accordingly).

MPLS process/services 244 contain computer executable instructions executed by processor 220 to perform functions provided by the MPLS protocol, such as for MPLS LSP communication or MPLS PW communication, as will be understood by those skilled in the art. These functions may be configured to manage a forwarding information data-base (not shown) containing, e.g., data used to make forwarding decisions. In particular, MPLS is generally considered a "tunneling protocol," where circuits are created between a head-end LSR (MEP) and a tail-end LSR (MEP), traversing one or more intermediate LSRs (MIPs) (e.g., from LSR A to LSR D via LSRs B and C). Each LSR allocates a label for the MPLS circuit, and informs its upstream neighbor to use the allocated label to forward traffic on the circuit (in addition to a transport label for the upstream neighbor to reach the LSR). Upon receiving traffic with the allocated label, the LSR determines the corresponding MPLS circuit, and pushes a label expected/allocated by its downstream neighbor. Those skilled in the art will also appreciate that MPLS circuits may be multi-layered or "nested," such that a circuit/tunnel hierarchy is formed where one or more tunnels may be carried via other tunnels.

As noted above, MPLS Transport Profile (MPLS-TP) networks are currently being deployed by service providers to emulate traditional circuits (e.g., ATM/SONET/etc.) with MPLS circuits (LSPs or PWs). When MPLS is used as a transport network, the MPLS circuits are generally bi-directional, or at least comprise two uni-directional circuits that must terminate at the same end points. In traditional transport networks, however, service providers operate the transport circuit in loopback mode for management purposes, e.g., to test connectivity of the circuit up to that specific device on the circuit's path by sending packets to that device, and monitoring the return ("loopback") of the packets. MPLS-TP networks currently do not provide the loopback capability. In particular, the ability for MPLS circuits to nest creates opportunity for endless loops to occur, and there are no provisions within MPLS for accurately addressing a particular LSR within a circuit/tunnel (since the purpose of a tunnel is to enter and exit the tunnel ends without stopping for processing along the path).

According to embodiments of the disclosure, therefore, an initiating maintenance end point (MEP) may transmit a lock message to lock a circuit traversing one or more maintenance intermediate points (MIPs) between the initiating MEP and an end MEP. The initiating MEP may then transmit an in-band packet containing a loopback request to a particular MIP along the circuit using a particular time-to-live (TTL) value in the packet to reach the particular MIP. Upon receiving the packet at the particular MIP, and in response to determining that the TTL has expired, the particular MIP inspects the packet to discover the loopback request, and correspondingly operates in a loopback mode.

Illustratively, the techniques described herein may be performed by hardware, software, and/or firmware, such as in accordance with MPLS process 244 and particularly maintenance point process 246 (MEP/MIP process), which may contain computer executable instructions executed by the processor 220 to perform functions relating to the novel techniques described herein to extend MPLS Operation, Administration, and Maintenance (OAM) to allow a first LSR (e.g., MEP) to explicitly request a second LSR (e.g., MIP) to operate an MPLS LSP between the two LSRs in loopback mode. For example, this extension may be used to loop the data traffic up to a certain LSR in the path of the MPLS LSP back to the source for management purposes. Notably, as used herein, an MPLS "circuit" may be an LSP or a multi-segment pseudowire (MS-PW).

Figure 3:
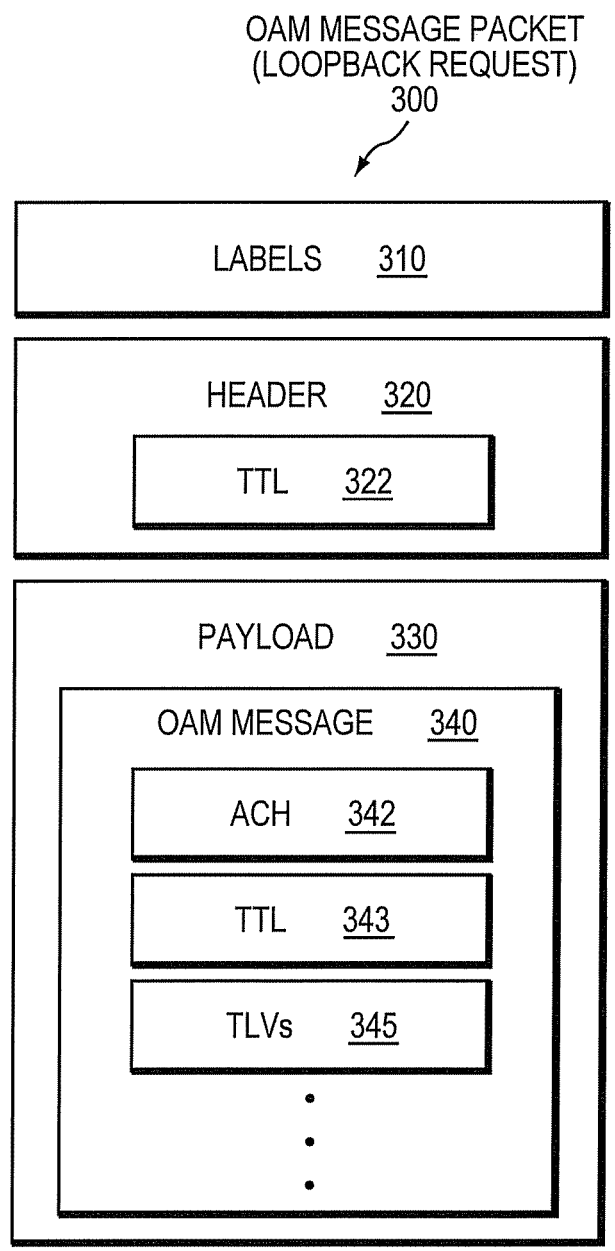
FIG. 3 illustrates an example packet/message.

Operationally, to describe the loopback functionality, assume a bi-directional MPLS-TP LSP as shown in FIG. 1 from LSR A to LSR D via LSRs B and C (where A-D are MPLS capable nodes). Furthermore, assume that LSR A wants LSR C to loop packets sent from A to C back to A (i.e., a loopback function). In this example, LSR A and LSR D act as Maintenance End Points (MEPs) and LSR B and LSR C act as Maintenance Intermediate Points (MIPs). Further, FIG. 3 illustrates an example (and simplified) OAM message packet 300. In particular, packet 300 may comprise one or more conventional headers (depending upon the transport protocol utilized and other factors), such as labels 310, a packet header 320 with a TTL value field 322, and a payload 330. Payload 330 may illustratively comprise the OAM message 340, an associated channel header (ACH) field 342, an inner TTL field (described below), and one or more TLVs (type/length/value objects) 345. In particular, the ACH field 342 may be used to carry "type" and "operation" codes (e.g., "type/op" codes), generally for in-band messages, such as in accordance with the techniques described herein. For example, the ACH field may define types comprising a loopback request, reply, or echo, and may have one of several different operations corresponding to the type. For instance, example operations may comprise a null operation (e.g., for echo messages), a lock operation, an unlock operation, an operation to set/unset a "full loopback" mode, and an operation to set/unset an "OAM loopback" mode. Alternatively, or in addition, TLVs may carry the desired information, such as a Lock Request TLV, an Unlock Request TLV, a Loopback Request TLV (e.g., with a flag indicating full or OAM loopback), a Loopback Removal TLV, an Authentication TLV, a Source Identifier TLV (not needed in IP MPLS-OAM message version), a Target Identifier TLV (needed to verify that the Loopback OAM message is meant for this node), and a Response TLV. (Note that certain ACH code type/ops may also be carried in TLVs, such as a Lock/Unlock Request TLVs, Loopback Request/Removal TLV, etc., e.g., for out-of-band messages, as may be appreciated by those skilled in the art.)

According to one or more embodiments described herein, LSR A may first transmit an MPLS OAM packet 300 (e.g., in-band) along the MPLS-TP LSP to lock the circuit (e.g., a lock operation). The message will be intercepted by LSR D since it is at the end of the LSP (i.e., is the end MEP). Upon receiving the lock message/request, the end MEP LSR D may lock the circuit from data plane traffic, to ensure that data does not loop during the loopback mode, and may acknowledge that the circuit is locked to the initiating MEP. Note that the lock message (or its acknowledgment) can be optional, such as in case the end MEP (TPE) is not reachable (e.g., due to failure of the circuit). As such, it may still be beneficial to loopback to a particular MIP on the circuit, e.g., for diagnostic purposes.

Once the lock request has been acknowledged (or not, in certain configurations), then the initiating MEP (LSR A) may transmit an in-band packet 150 containing a loopback request (OAM message 300) to a particular MIP along the circuit using a particular TTL value 322 in the packet to reach the particular MIP. In other words, when LSR D responds with an "ACK" to the lock request, LSR A sends another OAM message 300 with the correct MPLS TTL value on the OAM packet so that the MPLS OAM packet is intercepted by LSR C because of the MPLS TTL expiry (e.g., an initial TTL of 2).

This second MPLS OAM packet 300 contains a request to instruct LSR C to operate the corresponding MPLS-TP LSP in loopback mode. As such, upon receiving the packet at a MIP, the TTL value 322 is decremented, and if the TTL has expired (i.e., equals 0), then the receiving MIP may inspect the packet to discover the loopback request 300 (e.g., based on an ACH field of the packet). The OAM message 300 (payload portion 340) may contain an identification (ID) of the desired MIP (e.g., a target ID), along with an ID of the MPLS LSP, such that the receiving MIP may confirm that it has properly received the OAM message prior to acknowledging entry into loopback mode at the particular MIP to the initiating MEP. Otherwise, the receive MIP may send a non-acknowledgment (NAK or NACK) message back to the initiating MIP (LSR A).

Figure 4:
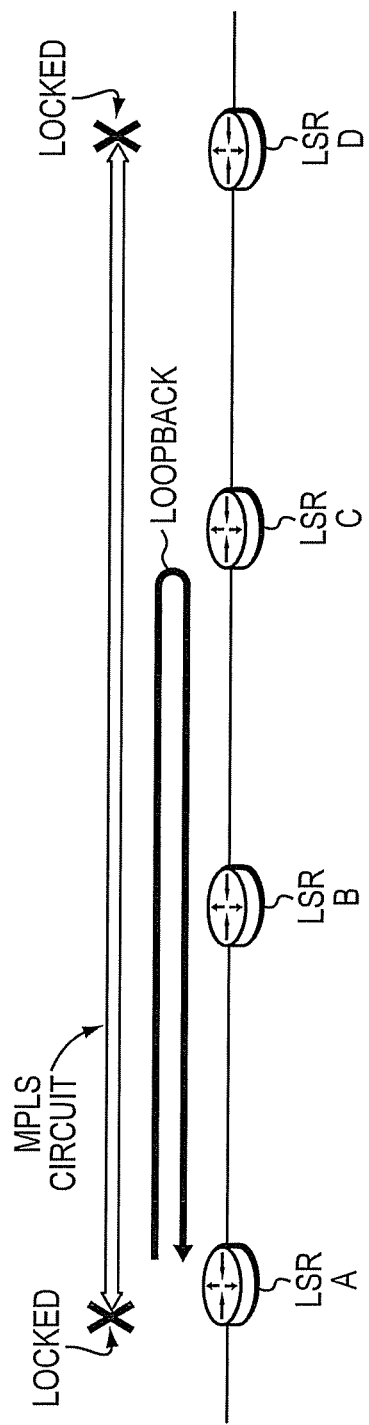
FIG. 4 illustrates an example network showing MPLS circuit loopback.

Once the circuit is operating in loopback mode at the particular MIP in response to the loopback request, data packets sent from LSR A (initiating MEP) to LSR C (particular MIP) sent over that LSP are looped back to LSR A. FIG. 4 briefly illustrates an example loopback mode operation (e.g., showing a locked MPLS LSP). During loopback mode, various OAM functions may be performed, such as obtaining a round trip time (RTT) for traffic to loopback on the circuit from the initiating MEP to the particular MIP and back to the initiating MEP, or monitoring packet loss (e.g., where loopback packets may have serial numbers to check for loss), or other network management functions. Note that according to one or more embodiments, loopback mode may be intrusive (e.g., full loopback, looping all traffic, including data traffic) or non-intrusive (OAM loopback, looping only OAM messages and not data traffic).

When loopback mode operation is no longer required, the initiating MEP (e.g., LSR A) sends another MPLS OAM message to remove the loopback mode operation, and the MPLS TTL is set such that this message is intercepted by the particular MIP (e.g., LSR C). In other words, the initiating MEP may transmit a cease/remove loopback request packet 300 to the particular MIP using the particular TTL value in the cease loopback request packet, such that upon receiving the cease loopback request packet at the particular MIP, the TTL is expired, and by inspecting the packet, the particular MIP may discover the actual cease loopback request. Accordingly, the particular MIP may exit loopback mode, and may send a reply/acknowledgment back to the initiating MEP.

Upon receiving an ACK response to the loopback mode removal request, the initiating MEP (e.g., LSR A) may send another MPLS OAM message 300 to unlock the LSP (if necessary), where this message is intercepted by the end MEP (e.g., LSR D) as it is at the end of the LSP. In particular, the initiating MEP may transmit the unlock message to the end MEP, which receives it and correspondingly unlocks the circuit and acknowledges that the circuit is unlocked at the end MEP. The initiating MEP may then unlock the circuit at its end, as well. In addition, as noted, a non-acknowledging message may be transmitted from the particular MIP to the initiating MEP in response to not entering loopback mode at the particular MIP. For example, the particular MIP may not understand the message, or may not be otherwise configured or able to enter loopback model. In the case of a NAK, the initiating MEP may also send the unlock message if the circuit had already been locked.

Note that the description above makes the implicit assumption that the nodes (LSRs) are capable of understanding the OAM messages, processing the ACH, and are capable of performing the circuit loopback operation. For embodiments where the circuit is a pseudowire (PW), specifically, these capabilities may be explicitly communicated between MEPs and MIPs, e.g., through capability signaling.

Figure 5:
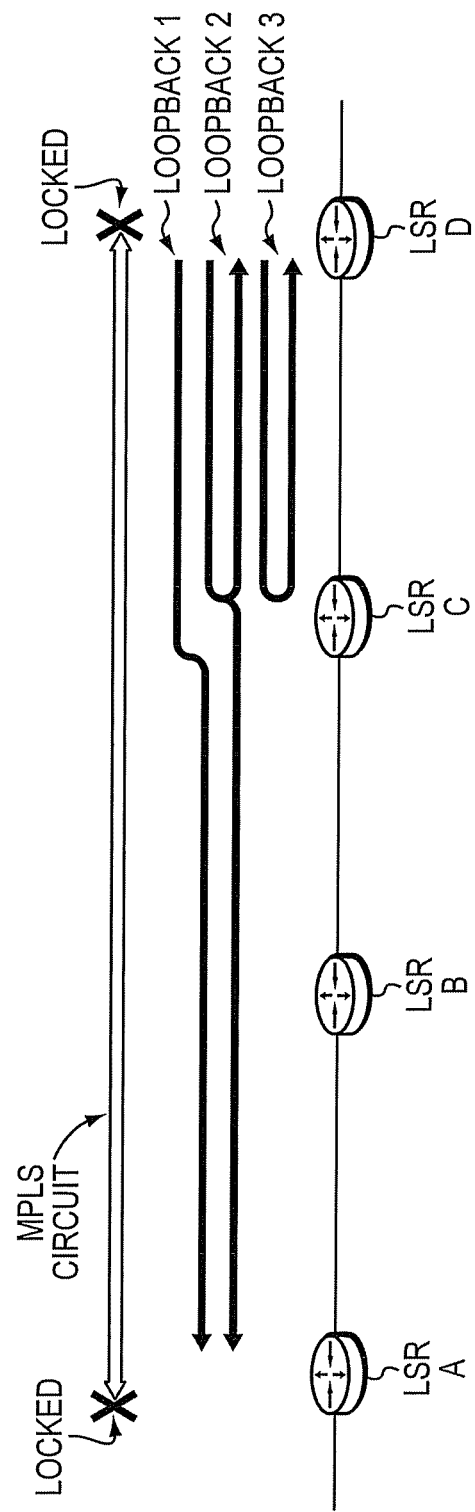
FIG. 5 illustrates another example network showing MPLS circuit loopback.

Moreover, it has been implied that a loopback request message asks for a loop towards the received direction (i.e., back toward the initiating MEP from which the request was received). Potentially, a loopback request may specify to which direction the loop is requested (e.g., from LSR C back to LSR A and/or to end MEP/LSR D, or drop the traffic). In addition, the loopback request may specify a direction the particular MIP is to loop traffic on the circuit received from the end MEP, that is which direction LSR C is to loop traffic received from end MEP LSR D, not just from initiating MEP LSR A. FIG. 5 briefly illustrates some possible loopback directions, from the perspective of receiving traffic from the end MEP LSR D. In particular, loopback 1 illustrates an example of LSR C also "looping" traffic from LSR D to LSR A (e.g., not necessarily a loop, however an option that may prevent LSR C from returning traffic to LSR D in loopback mode, thus sending/looping all traffic from LSR C to LSR A). Loopback 2 on the other hand loops traffic in both directions, i.e., to back to LSR D, and forward to LSR A (e.g., with a copy of the data in one of the directions). Loopback 3 simply illustrates a conventional loop back from LSR D back to LSR D, accordingly. (Note that an additional option is to drop the traffic.)

Furthermore, one additional aspect of one or more embodiments herein provide for infinite loop avoidance, achieved through one or more mechanisms. For instance, the locking mechanism ensures that no data traffic is looped, as there is no data traffic on the looping circuit. Further, other infinite loop avoidance mechanisms may be used, such as TTL values in the loopback traffic (e.g., TTL value 322 or inner TTL field 343), or including some "looped already" bit in the ACH 342 of the looped traffic (indicating that the traffic has already been looped by the particular MIP), etc.

Figure 6:
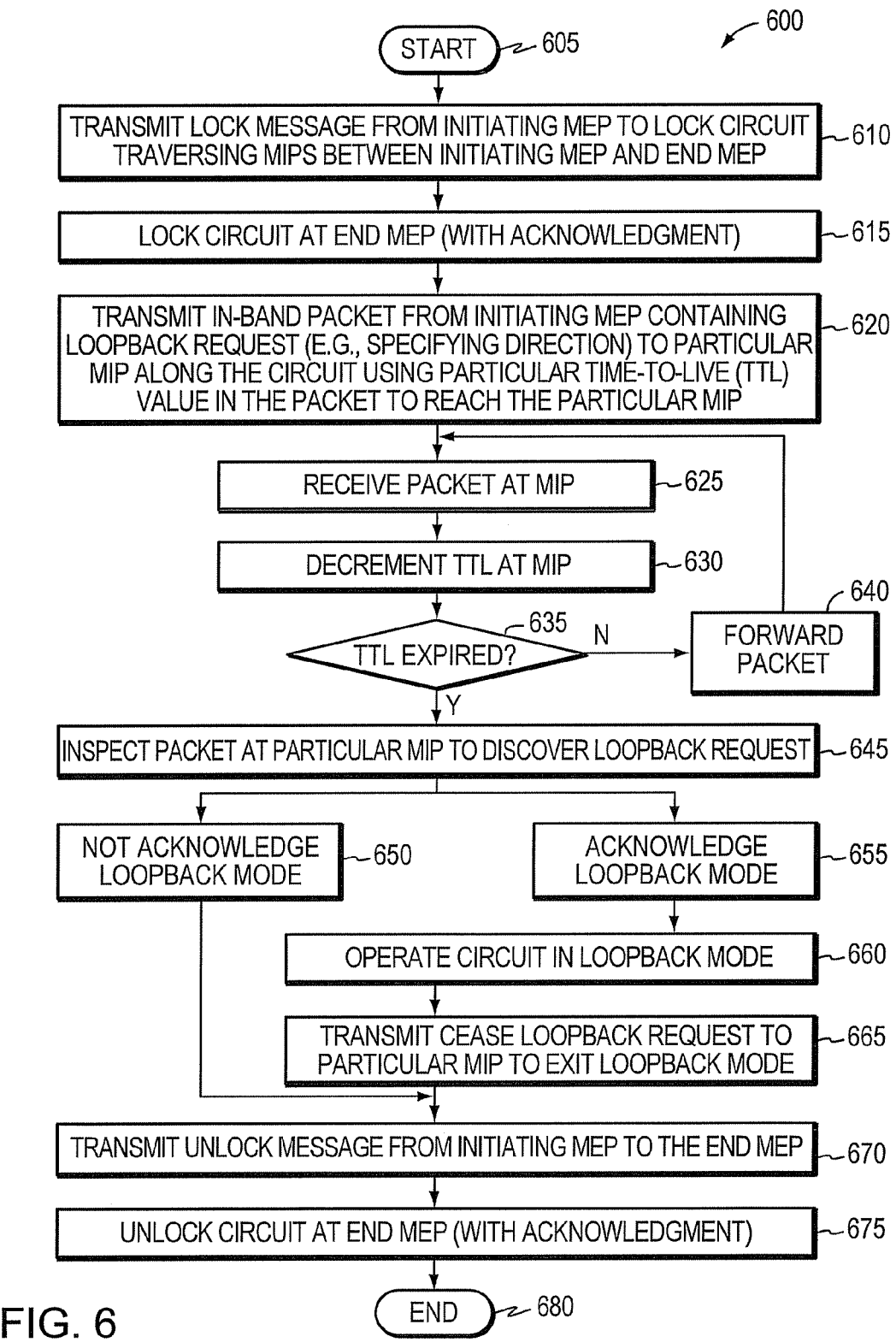
FIG. 6 illustrates an example procedure for MPLS circuit loopback.

FIG. 6 illustrates a simplified example procedure for providing loopback mode for MPLS circuits in accordance with one or more embodiments described herein. The procedure 600 starts at step 605, and continues to step 610, where the initiating MEP (e.g., LSR A) transmits a lock message (e.g., a generic message 300) to lock the circuit traversing MIPs (e.g., LSRs B and C) between the initiating MEP and an end MEP (e.g., LSR D). Assuming the circuit is operating properly, the end MEP may lock the circuit in step 615, and may send an acknowledgment to the initiating MEP (note, as mentioned above, the initiating MEP may proceed without the acknowledgement under assumption or knowledge that the circuit is broken).

In step 620, the initiating MEP transmits an in-band packet 150 containing the loopback request 300 to a particular MIP (e.g., LSR D) along the circuit using a particular TTL value 322 (e.g., 2) in the packet to reach the particular MIP. As described above, the loopback request may specify a particular direction to loop traffic, either from the initiating MEP or the end MEP. Each MIP may receive the packet in step 625, and if after decrementing the TTL value in step 630 the TTL has yet to expire in step 635, then the packet is forwarded in step 640 to a next MIP (or to the end MEP), accordingly.

If, on the other hand, in step 635 the TTL value has expired (equals 0) at the receiving MIP, then in step 645 the receiving MIP inspects the packet to discover the loopback request 300. Either due to inability to process the request, an improper MIP ID, or other reason, the receiving MIP may not acknowledge (e.g., may send a NACK) the loopback mode, and the procedure may skip to step 670, described below. However, if loopback mode is acknowledged in step 655 by the receiving MIP (i.e., the particular MIP to which the loopback request was directed), may operate in loopback mode in step 660 with the MEPs of the MPLS circuit. For example, as noted above, packet loss, RTT measurements, general connectivity, etc., may be tested using the loopback mode, accordingly.

Once it is desired to exit loopback mode, the initiating MEP may transmit a cease loopback request 300 in step 665 to the particular MIP to exit loopback mode. If the circuit had been previously locked (e.g., prior to a successful or unsuccessful loopback mode), then in step 670 an unlock message may be transmitted from the initiating MEP to the end MEP, which may unlock the circuit at step 675, e.g., with acknowledgment. The procedure 600 then ends in step 680.

Advantageously, the novel techniques described herein provide a loopback mode for MPLS LSPs or PWs in a computer network as though they were real wires that can be looped back. Through the specific mechanisms described above, the novel techniques allow for a particular MIP of the MPLS circuit to properly enter and exit loopback mode, while avoiding loops, and other associated problematic features with MPLS circuits in loopback mode. Also, the dynamic aspects of one or more embodiments described herein alleviate the need for cumbersome and inefficient manual configuration, such as the ability to place an MPLS circuit in loopback mode dynamically in order to check connectivity up to a certain MIP/LSR on the circuit.

For example, while in loopback mode, in accordance with one or more further additional embodiments described herein, performance characteristics may be measured within a loopback message (or other OAM message) either on demand (as requested) or continuously (while the LSP is in service). For instance, packet loss, delay, jitter, etc., may be measured to the receiving MIP, stored in the propagated loopback/OAM message (e.g., within a Performance Characteristic TLV), and returned to the initiating MEP. Alternatively or in addition, these measurements may be performed solely by the initiating MEP, thus measuring round-trip (two-way) characteristics (e.g., using timestamps, sequence numbers, etc.). (Illustratively, the MPLS LSP may be locked prior to measuring the performance characteristic, though need not be.) Moreover, in the event that the measured performance characteristics are out-of-policy (e.g., too many lost packets, too long of a delay, etc.), a switchover event may be initiated by the initiating MEP or a measuring MIP to select a new LSP path that has performance characteristics that are in-policy (or at least that are better than the previous LSP path).

While there have been shown and described illustrative embodiments that provide loopback mode for MPLS circuits in a computer network, it is to be understood that various other adaptations and modifications may be made within the spirit and scope of the present invention. For example, the embodiments have been shown and described herein using in-band loopback requests. However, the embodiments of the invention in their broader sense are not so limited, and may, in fact, be used for non-transport non-static MPLS LSPs/PWs (where signaling is used) from using out-of-band signaling for these requests. In addition, the techniques have been described for multi-segment pseudowires, though equal-cost multipath (ECMP) pseudowires/circuits may also advantageously utilize the invention. In particular, ECMP would occur for PWs between a terminating provider edge (T-PE) and switching PE (SPE) and between SPEs, however the end point for the PW is fixed and is where the loopback is performed.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
receiving, by a maintenance intermediate point (MIP) in a circuit, an in-band packet from an initiating maintenance end point (MEP) in the circuit, the in-band packet including a loopback request and a time to-to-live value, wherein:
the MIP is located in the circuit between the initiating MEP and an end MEP, and
the initiating MEP transmitted the in-band packet in response to receiving an acknowledgement message from the end MEP that the circuit has been locked from passing data plane traffic along the circuit;
in response to determining that the time-to-live value has expired and that the in-band packet includes the loopback request, entering, by the MIP, a loopback mode during which in-band packets received by the MIP from the initiating MEP are looped back towards the initiating MEP;
while operating in loopback mode, receiving, by the MIP, a second in-band packet including a second time-to-live value and a cease loopback request; and
in response to determining that the second time-to-live value has expired and that the second in-band packet includes the cease loopback request, ceasing, by the MIP, loopback mode, after which in-band packets received by the MIP from the initiating MEP are forwarded towards the end MEP.

2. The method of claim 1, wherein the second time-to-live value is configured to expire at the MIP.

3. The method of claim 1, further comprising:
transmitting an acknowledgement to the initiating MEP indicating that the circuit is in the loopback mode at the MIP.

4. The method of claim 1, wherein
after the MIP ceases loopback mode, the initiating MEP transmits an unlock message to the end MEP, causing the end MEP to unlock the circuit and resume passing data plane traffic along the circuit.

5. The method of claim 1, wherein the loopback request is carried in an associated channel header field of the in-band packet.

6. The method of claim 1, wherein the in-band packet specifies a direction along the circuit that the MIP is to loop traffic.

7. The method of claim 6, wherein the specified direction includes a direction along the circuit that the MIP is to loop traffic received from the end MEP.

8. The method of claim 1, wherein during loopback mode, the initiating MEP measures a performance characteristic within the loopback mode.

9. The method of claim 8, wherein the initiating MEP initiates a switchover event in response to the measured performance characteristic being out-of-policy.

10. A maintenance intermediate point (MIP) in a circuit, comprising:
one or more computer processors; and
a memory containing instructions that, when executed by the one or more computer processors, cause the MIP to:
receive an in-band packet from an initiating maintenance end point (MEP) in the circuit, the in-band packet including a loopback request and a time to-to-live value, wherein:
the MIP is located in the circuit between the initiating MEP and an end MEP, and
the initiating MEP transmitted the in-band packet in response to receiving an acknowledgement message from the end MEP that the circuit has been locked from passing data plane traffic along the circuit;
in response to determining that the time-to-live value has expired and that the in-band packet includes the loopback request, enter a loopback mode during which in-band packets received by the MIP from the initiating MEP are looped back towards the initiating MEP;
while operating in loopback mode, receive a second in-band packet including a second time-to-live value and a cease loopback request; and
in response to determining that the second time-to-live value has expired and that the second in-band packet includes the cease loopback request, cease loopback mode, after which in-band packets received by the MIP from the initiating MEP are forwarded towards the end MEP.

11. The MIP of claim 10, wherein the second time-to-live value is configured to expire at the MIP.

12. The MIP of claim 10, wherein the instructions further cause the MIP to:
transmit an acknowledgement to the initiating MEP indicating that the circuit is in the loopback mode at the MIP.

13. The MIP of claim 10, wherein after the MIP ceases loopback mode, the initiating MEP transmits an unlock message to the end MEP, causing the end MEP to unlock the circuit and resume passing data plane traffic along the circuit.

14. The MIP of claim 10, wherein the loopback request is carried in an associated channel header field of the in-band packet.

15. The MIP of claim 10, wherein the in-band packet specifies a direction along the circuit that the MIP is to loop traffic.

16. A non-transitory computer-readable medium storing instructions that, when executed by a maintenance intermediate point (MIP) in a circuit, cause the MIP to:
receive an in-band packet from an initiating maintenance end point (MEP) in the circuit, the in-band packet including a loopback request and a time to-to-live value, wherein:
the MIP is located in the circuit between the initiating MEP and an end MEP, and
the initiating MEP transmitted the in-band packet in response to receiving an acknowledgement message from the end MEP that the circuit has been locked from passing data plane traffic along the circuit;
in response to determining that the time-to-live value has expired and that the in-band packet includes the loopback request, enter a loopback mode during which in-band packets received by the MIP from the initiating MEP are looped back towards the initiating MEP;
while operating in loopback mode, receive a second in-band packet including a second time-to-live value and a cease loopback request; and
in response to determining that the second time-to-live value has expired and that the second in-band packet includes the cease loopback request, cease loopback mode, after which in-band packets received by the MIP from the initiating MEP are forwarded towards the end MEP.

17. The non-transitory computer-readable medium of claim 16, wherein the second time-to-live value is configured to expire at the MIP.

18. The non-transitory computer-readable medium of claim 16, wherein the instructions further cause the MIP to:
transmit an acknowledgement to the initiating MEP indicating that the circuit is in the loopback mode at the MIP.

19. The non-transitory computer-readable medium of claim 16, wherein after the MIP ceases loopback mode, the initiating MEP transmits an unlock message to the end MEP, causing the end MEP to unlock the circuit and resume passing data plane traffic along the circuit.

20. The non-transitory computer-readable medium of claim 16, wherein the loopback request is carried in an associated channel header field of the in-band packet.

* * * * *